United States Patent [19]

Krieg et al.

[11] 3,872,281

[45] Mar. 18, 1975

[54] BAND TYPE ELECTRIC HEATERS

[76] Inventors: John W. Krieg; Alfred Gaudio; Victor F. Borek, all of 3575 Lawson Blvd., Oceanside, N.Y. 11572

[22] Filed: June 5, 1974

[21] Appl. No.: 476,574

[52] U.S. Cl................. 219/535, 219/528, 219/530, 219/541, 219/544, 338/251, 338/276, 338/301
[51] Int. Cl. ............................................ H05b 3/58
[58] Field of Search .......... 219/528, 530, 535, 541, 219/544, 552, 212, 213, 386; 338/249, 251, 254, 255, 256, 276, 301, 314

[56] References Cited
UNITED STATES PATENTS

| | | | |
|---|---|---|---|
| 1,150,426 | 8/1915 | Hadaway, Jr. .................. 219/535 X |
| 1,976,624 | 10/1934 | Mucher............................. 338/251 |
| 2,460,625 | 2/1949 | Ellis .............................. 219/213 X |
| 2,545,653 | 3/1951 | Desloge .......................... 219/535 X |
| 2,817,742 | 12/1957 | Drugmand ......................... 219/528 |
| 3,233,078 | 2/1966 | Siemianowsky.................... 219/213 |
| 3,730,373 | 5/1973 | Kozbelt............................ 219/535 |
| 3,808,573 | 4/1974 | Cappell........................... 338/249 |
| 3,829,654 | 8/1974 | Eisler.............................. 219/386 |
| 3,829,657 | 8/1974 | Hinz................................ 219/535 |

FOREIGN PATENTS OR APPLICATIONS
1,124,164  2/1962  Germany .......................... 338/256

Primary Examiner—Volodymyr Y. Mayewsky
Attorney, Agent, or Firm—Bauer & Amer

[57] ABSTRACT

A band heater in which a heating element sandwiched between two mica covers is placed between a base member and a pressure band with sidewalls of the pressure band being interleaved with sidewalls of the base member. The interleaved sidewalls are bent inwardly into contact with the surface of the pressure band so that the pressure band and the base member are clamped together along their edges. When the heater is then bent into an object encircling configuration, the pressure band tightly presses the mica covers and the heating element together between the base member and the pressure band thereby minimizing distortion of the heating element when said element is raised to a high temperature during operation of the heater.

4 Claims, 7 Drawing Figures

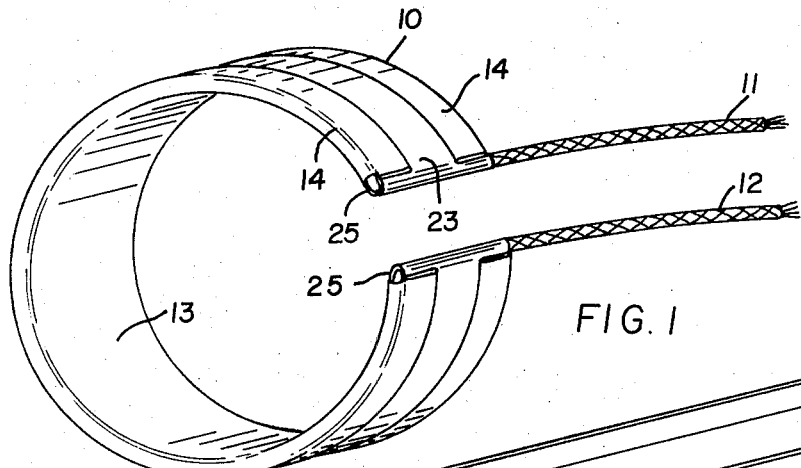
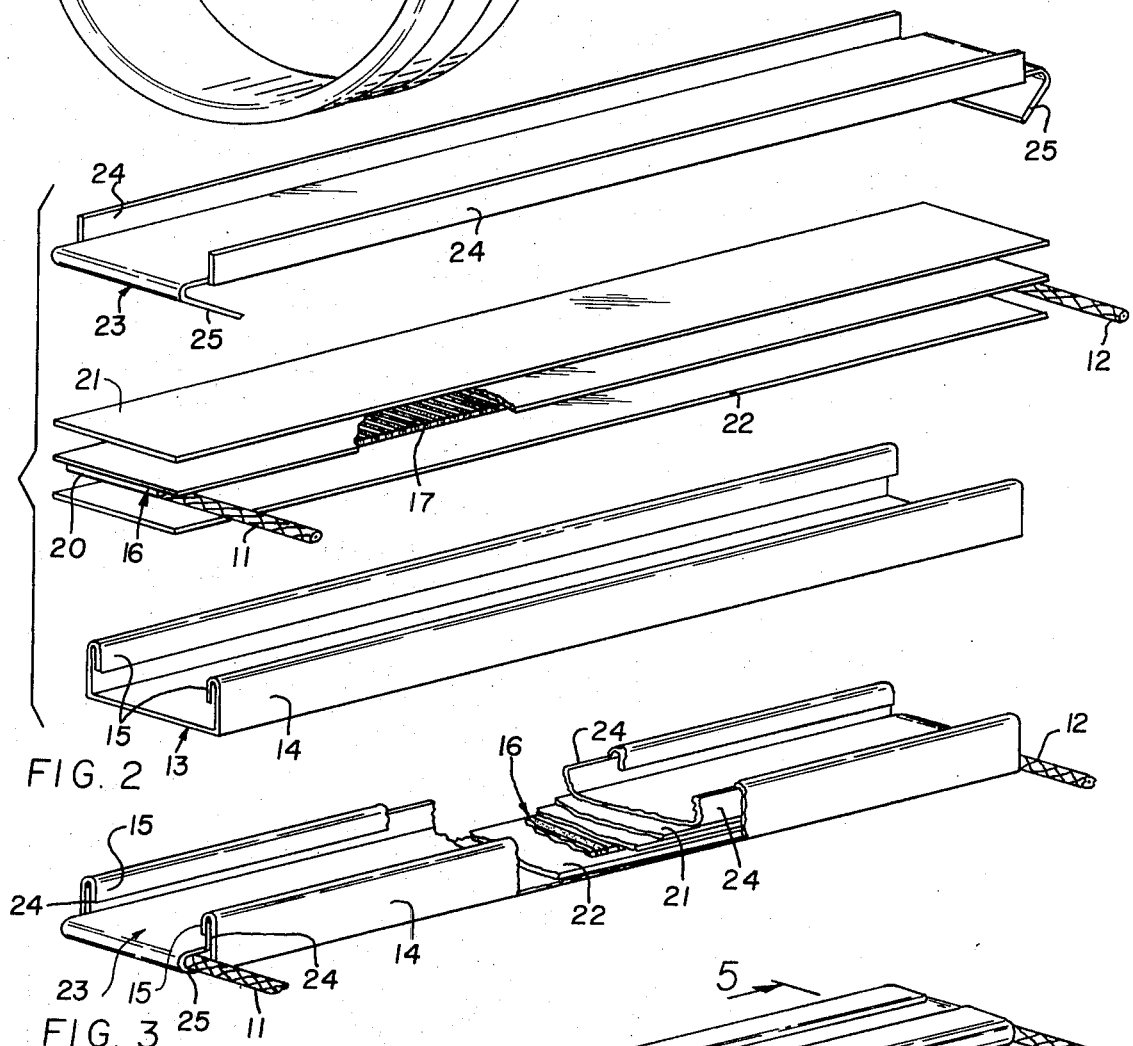
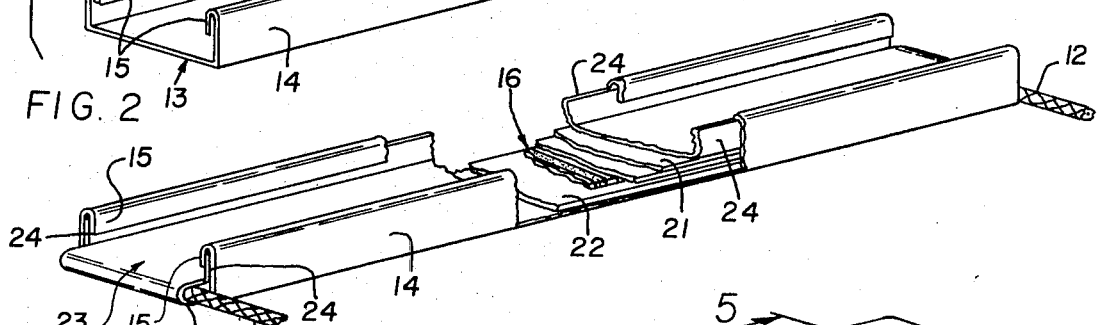
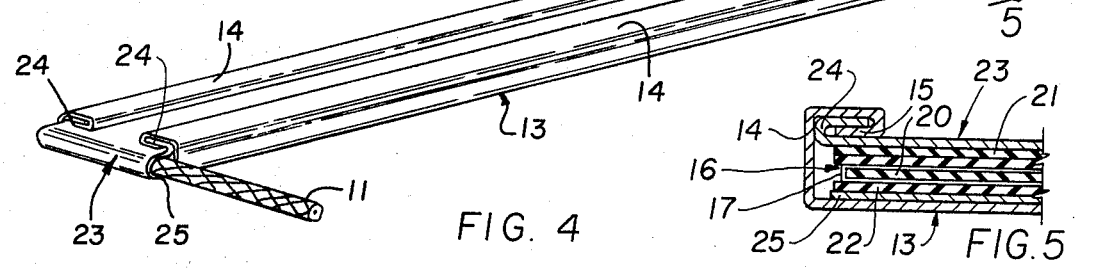

PATENTED MAR 18 1975 3,872,281

BAND TYPE ELECTRIC HEATERS

This invention relates to electric heaters, and more particularly to so-called band type heaters. Such heaters are especially useful in plastic molding machines wherein a plurality of heaters are secured along the outside surface of the heater cylinder in which the powdered plastic material is melted and mixed before being ejected through an extrusion die or into an injection mold. Of course, band type heaters may find other applications, but their use on plastic molding machines is very extensive.

BACKGROUND OF THE INVENTION

Band type heaters heat by conduction, and consequently intimate contact has to be made between the heater and the object being heated. Thus, the prior art was primarily concerned with insuring the efficient transfer of heat from the heater to the heated object by the provision of clamping devices secured to the ends of the heater, which devices, when tightened, draw the heater into close contact with the heated object. Various prior art arrangements are shown, for example, in U.S. Pat. Nos. 2,477,341; 2,817,742; 3,475,597; 3,619,566; and 3,730,373. While the arrangements disclosed in the above patents have, in general, been satisfactory, it has been found that quite often heaters still fail after a relatively short life when hot spots develop causing the heating element to burn out. To avoid such consequences, heaters are operated at a watt-density somewhat lower than would otherwise be desirable. This, of course, means that more heaters are required for an installation than would be the case if heaters operating at a higher watt-density were provided.

It is believed that heaters must be constructed in such a way that, even within the heater itself, heat is uniformly conducted from the heating element to the heat conducting casing of the heater, and further that the heating element must be securely sandwiched between dielectric, i.e., mica, covers so that during operation of the heater there is little possibility of the heating element distorting to an extent that would cause shorting out of turns of the heating element wire. Thus, construction of a band type heater that takes these two considerations into account should enable heaters to operate at a higher watt-density with less liklihood of failure.

Accordingly, it is an object of the present invention to provide an improved band heater.

It is another object of the invention to provide band heaters capable of operating at high watt-densities.

Another object of the invention is to provide a band heater which uniformly conducts heat from the heating element to the casing of the heater.

Still another object of the invention is to provide a band heater in which the heating element in constrained against distortion.

SUMMARY OF THE INVENTION

In carrying out the invention there is provided a base member having upstanding sidewalls that are bent over to form an inverted U-shaped rim, a heating element sandwiched between two mica covers, and a pressure band having upstanding sidewalls. These components are assembled with the heating element sandwich being placed on the base member between its sidewalls, the pressure band placed over the sandwich with its sidewalls fitting between the U-shaped rim of the base member sidewalls. The interleaved sidewalls of the pressure band and the base member are then folded inwardly over the pressure band to form an assembly of clamped together components, after which the assembly is bent to the desired heater configuration. In a further embodiment, the pressure band is extended at both ends so that the extended portions can be bent downwardly and around the ends of the heating element sandwich prior to these components being placed in the base member and further formed as above described. This second embodiment provides an essentially sealed heater.

Features and advantages of the invention may be gained from the foregoing and from the description of a preferred embodiment of the invention which follows.

In the drawing:

FIG. 1 is a perspective view of a band heater according to the present invention;

FIG. 2 is an exploded view, in perspective, of the component parts of the band heater of the present invention;

FIG. 3 is a perspective view of the assembled component parts of the band heater at one stage of manufacture;

FIG. 4 is a perspective view of the band heater prior to being formed into final heater configuration;

FIG. 5 is an enlarged sectional view taken on line 5 — 5 of FIG. 4;

DETAILED DESCRIPTION OF THE INVENTION

Figure 6:
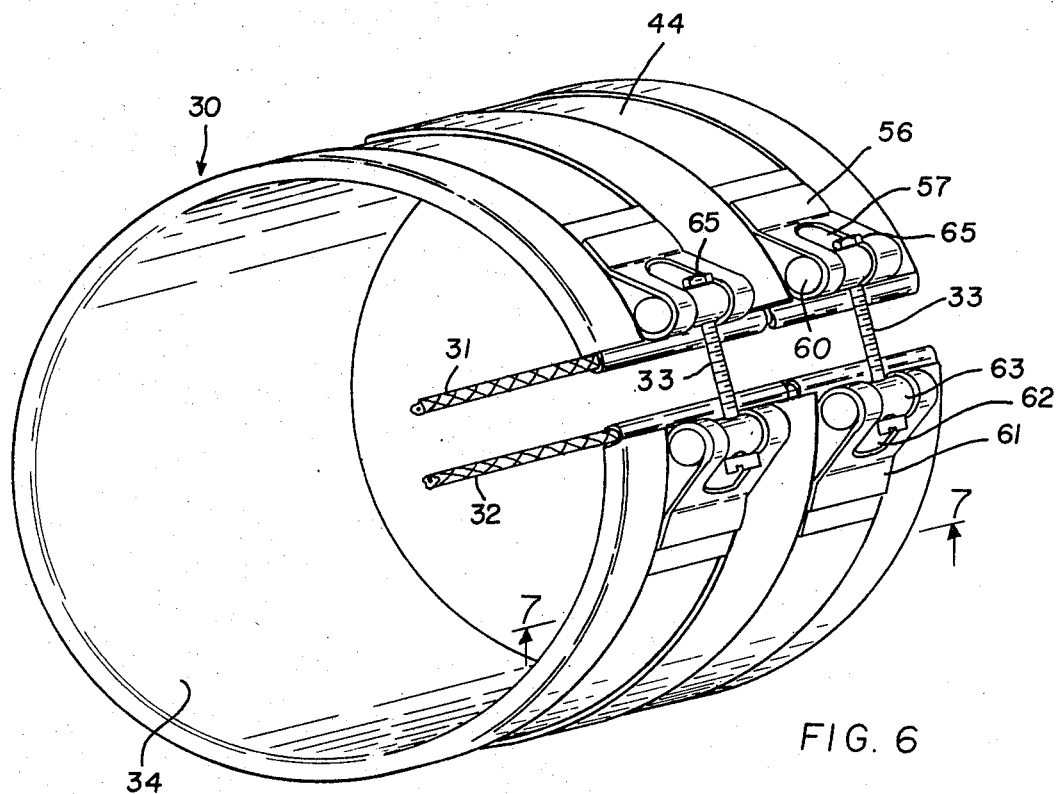
FIG. 6 is a perspective view of another embodiment of the invention.

Reference is now made to the drawing wherein a band heater 10 made in accordance with the present invention is shown in a circular configuration for placement on a cylindrical object to be heated. This object could, for example, be the heater, nozzle, or die of a plastic molding machine. Two leads 11 and 12 are illustrated for connecting the heating element of the heater of a source of power. As previously noted, band heaters heat by conduction and, consequently, the interior diameter of heater 10 will conform to the outside diameter of the object on which heater 10 is placed so that there is an intimate contact between heater 10 and the object with a resultant efficient transfer of heat from the heater to the object being heated.

In FIG. 2, heater 10 is seen to comprise a channel-shaped base member 13, the upstanding sidewalls 14 of which are each provided with a downwardly projecting rim 15 spaced inwardly from wall 14. A heating element 16 is formed of a ribbon of nichrome wire 17 helically wound on a mica core 20. Wire 17 is joined at its ends to the leads 11 and 12 which preferably are covered with a metallic braid. Heating element 16 is sandwiched between two mica covers 21 and 22 which effectively insulate wire 17 from the metallic heat conducting parts of the heater. A metal pressure band 23 completes the components of the heater. Band 23 is a channel-shaped member, slightly narrower than base member 13, having upstanding sidewalls 24. As will be apparent hereinafter the height of sidewalls 24 is less than that of sidewalls 14. The ends of band 23 are shown terminating in downwardly folded legs 25 which, as will be explained, serve a useful purpose, especially in certain applications of heater 10.

In assembling heater 10, the sandwich of heating element 16 and mica covers 21 and 22 are placed underneath pressure band 23, that is, on the side of band 23 away from upstanding sidewalls 24. End legs 25 of band 23 are now folded tightly under the heating element sandwich to securely hold the heating element 16 and the covers 21 and 22 to the underside of band 23. This sub-assembly is next slipped endwise into base member 13. The folded legs 25 and mica cover 22 will be in contact with the top surface of member 13, and sidewalls 24 of band 23 will be positioned between sidewalls 14 and rim 15 of member 13. See FIG. 3. As shown in this figure, the length of the sub-assembly comprising pressure band 23 and the heating element sandwich will slightly exceed that of base member 13 so that leads 11 and 12 will just have room to pass the ends of sidewall 14.

Thereafter, the interleaved sidewalls 24 and 14 of pressure band 23 and base member 13, respectively, are folded inwardly as shown in FIG. 4. Next the heater is bent into the shape shown in FIG. 1. Of course, if the heater is to be applied to an object having a shape other than cylindrical, the heater would be bent accordingly. In bending the sidewalls 24 and 14 inwardly to give the structure shown in FIG. 4, pressure band 23 is effectively clamped along its edges to base member 13. The result is that when the assembly is bent to the final heater shape, as in FIG. 1, band 23 is tensioned along its entire length. This causes the heating element sandwich to be tightly squeezed between pressure band 23 and base member 13. Or in other words, heating element 16 is completely restrained between covers 21 and 22 and there is little liklihood of distortion of winding 17 and shorting out of some of its turns under operating conditions. Moreover, because of the construction of heater 10 as described, heating element 16, along its entire length, is in good heat conducting relationship with the metal parts, I.E., base member 13 and pressure band 23, of heater 10, thus minimizing the possibility of local hot spots during use and shortened heater life. It is further to be noted that as a result of the heater construction described, particularly the several layers of metal in the interleaved sidewalls, heater 10 is a structurally rigid unit which retains its shape under operating conditions and thus obviates, in many instances, the need for straps or clamping devices to hold it in contact with the object being heated. If desired, however, a clamping mechanism may be employed where the use of the same is deemed necessary.

It was noted hereinabove that heaters of the type described are often used on plastic molding machines. In such machines, it is not unusual for the molten plastic to leak at some joint in the flow path of the plastic. For example, there is a tendency for plastic to leak around the nozzle area of extrusion machines, and heaters, which are located in this area of a machine because of the need to insure the flowability of the plastic, have been damaged by plastic material leaking into the heating element of the heater. It is to prevent such an occurrence that legs 25 are provided on pressure band 23 since these legs effectively seal heating element 16 within the heater. If this type problem is not of concern, legs 25 may be omitted from pressure band 23.

Attention is now directed to FIG. 6 of the drawing wherein is shown a relatively wide heater 30. In the embodiment illustrated, a pair of leads 31 and 32 are shown for connecting the heating element of heater to an external source of power. Also, heater 30 is shown with a pair of clamping devices 33 for drawing heater 30 into close contact with the cylindrical object on which the heater may be mounted. Devices 33 will be described hereinafter.

Figure 7:
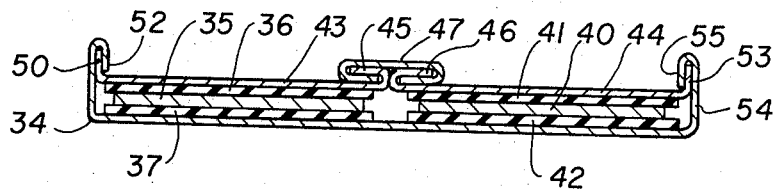
FIG. 7 is a sectional view taken on line 7 —7 of FIG. 6.

Inasmuch as the FIGS. 6 and 7 embodiment of the invention is similar in many respects to the embodiment hereinabove described, the description of these figures will be limited to those structural features which distinguish the two embodiments. Base member 34 is similar in all respects to base member 13 except that it is wider. Heating element 35 is sandwiched between mica covers 36 and 37, and heating element 40 is likewise sandwiched between mica covers 41 and 42. One end of the nichrome ribbon of heating element 35 is internally joined to one end of the nichrome ribbon of heating element 40 so that only two leads 31 and 32 will exit from heater 30 as shown in FIG. 6. Of course, instead of being internally connected, heating element 35 and heating element 40 could be externally connected, or the two heating elements could be independently connected to a source of power, in which case four leads would exit from heater 30. Moreover, a single heating element the width of heater 30 could be provided. In this latter case, mica covers as wide as the heater also would be provided.

In providing a relatively wide heater of the type shown in FIG. 6, it has been found desirable to provide a plurality of pressure bands in side by side relationship on the heater rather than a single pressure band as wide as the heater. The pressure bands 43 and 44 are similar to pressure band 23 except along the edge where they adjoin one another. There, instead of having an upstanding sidewall, they will have a folded in strip spaced from but parallel to the surface of the pressure band. See FIG. 7. The folded in strips 45 and 46 of two adjoining pressure bands 43 and 44 will be linked by a flattened out tubular key member 47 having a lengthwise slot of a width sufficient to enable member 47 to interlock pressure bands 43 and 44 as shown in FIG. 7. Pressure bands 43 and 44 may be provided at their ends with depending legs similar to legs 25 of pressure band 23 if such is desired for the same purposes.

In assembling heater 30, heating element 35 will be sandwiched between covers 36 and 37 and the unit secured to the underside of pressure band 43 by folding the depending legs thereof under bottom cover 37. Heating element 40 will be sandwiched between mica covers 41 and 42 and similarly secured to pressure band 44. These sub-asseblies will then be slipped endwise into base member 34 so that sidewall 50 of pressure band 43 is fitted between sidewall 51 and depending element 52 of base member 34, and sidewall 53 of pressure band 44 is fitting between sidewall 54 and depending element 55 of base member 34. Key member 47 will then be slipped over strips 45 and 46 to interlock pressure bands 43 and 44.

Interleaved sidewalls 50 and 51, and 53 and 54, are next folded inwardly (as in FIG. 4) to securely clamp pressure bands 43 and 44 to base member 34. Thereafter, the fully assembled heater is bent into a desired final shape, such as shown in FIG. 6. When so formed, heater 30 will have the same attributes ascribed to heater 10.

While a wide heater having two pressure bands has been illustrated and described, still wider heaters having more than two pressure bands could be provided. In such cases, the adjoining edges of the pressure bands will be formed as illustrated in FIG. 7 and key members such as member 47 will be provided to link such adjoining edges.

Attention is again directed to FIG. 6 and to the clamping devices 33 which were previously mentioned. Since the devices are identical, only one will be described. A first strip 56 having an elongated slot provided therein, i.e., shot 57, is bent around cylinder 60 and welded to one end of pressure band 44. A second strip 61, similarly provided with an elongated slot 62, is bent around a second cylinder 63 and welded to the other end of pressure band 44. Each cylinder is provided with a transverse diametrical aperture through which a machine screw 64 passes to be threaded into a nut 65. By rotating screw 64, nut 65 being prevented from turning by its engagement with the sides of slot 57, heater 30 can be tightened into intimate contact with an object to be heated. Other type clamping arrangements can be used if preferred.

Having thus described the invention, it is apparent that many changes could be made to the described embodiments without departing from the spirit and acope of the invention. Therefore, it is intended that the specification and the drawing be interpreted as illustrative rather than in a limiting sense.

What is claimed is:

1. A band type electric heater comprising a heating unit having a generally flat elongated heating element with electrical leads means thereon, a first dielectric member abutting one side of said heating element, a second dielectric member abutting the opposite side of said heating element, a metallic heat conducting base member abutting said first dielectric member, the opposite edges of said base member being folded in a 180° bend, a metallic heat conducting pressure band means abutting said second dielectric member, the opposite edges of said pressure band means being positioned within the folded edges of said base member and the thus interleaved edges of said base member and said pressure band means being folded back into abutment with the outer surface of said pressure band means whereby said base member and said pressure band means are interlocked along their opposite edges.

2. A band type heater according to claim 1 wherein said pressure band means includes an extension piece at each end thereof, said extension pieces being folded around the ends of said heating unit into position between said first dielectric member and said base member.

3. A band type electric heater comprising a metallic base member the opposite longitudinal edges of which are folded in a 180° bend, aplurality of metallic pressure band members positioned adjacent each other across the width of said base member, the outside longitudinal edge of each outside pressure band member being positioned in the adjacent folded edge of said base member, said interleaved edges of said base member and said pressure band members being folded back into abutting relationship with said pressure band members to thereby interlock said base member and said pressure band members, the adjacent edges of adjacent pressure band members being folded in a 180° bend, a key member for engaging and interlocking with the folded back adjacent edges of said pressure band members, and electric heating unit means sandwiched between said pressure band members and said metallic base member said electric heating unit means having electrical leads means.

4. A band type heater according to claim 3 wherein said electric heating unit means comprises a plurality of electric heating units, one for each pressure band member, each electric heating unit being positioned between a pressure band member and said base member.

* * * * *